Figure 6:
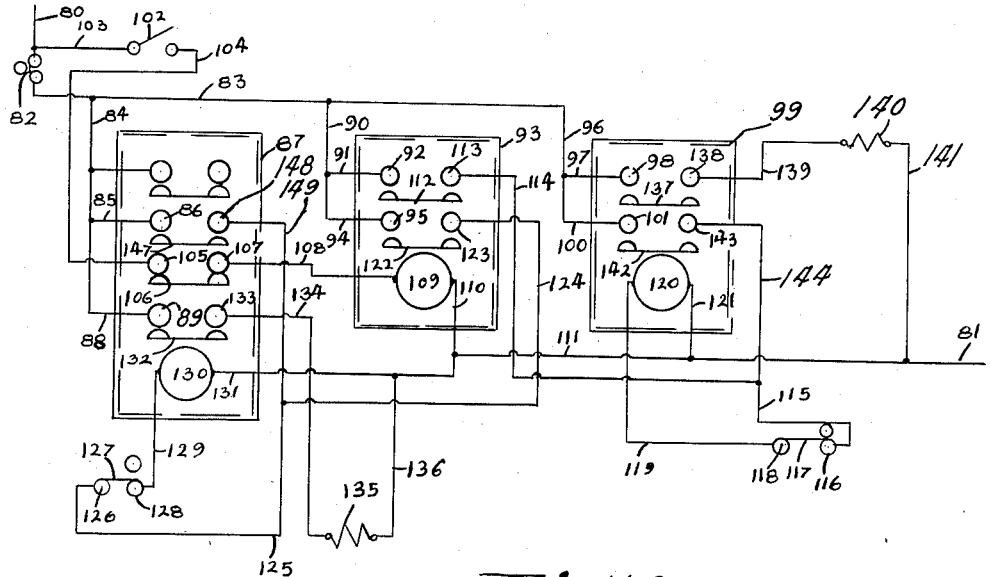

Feb. 5, 1963 E. R. OVERMAN 3,076,369
SYNCHRONIZING TWIN CUT-OFF MECHANISM
Filed Aug. 13, 1956 4 Sheets-Sheet 1
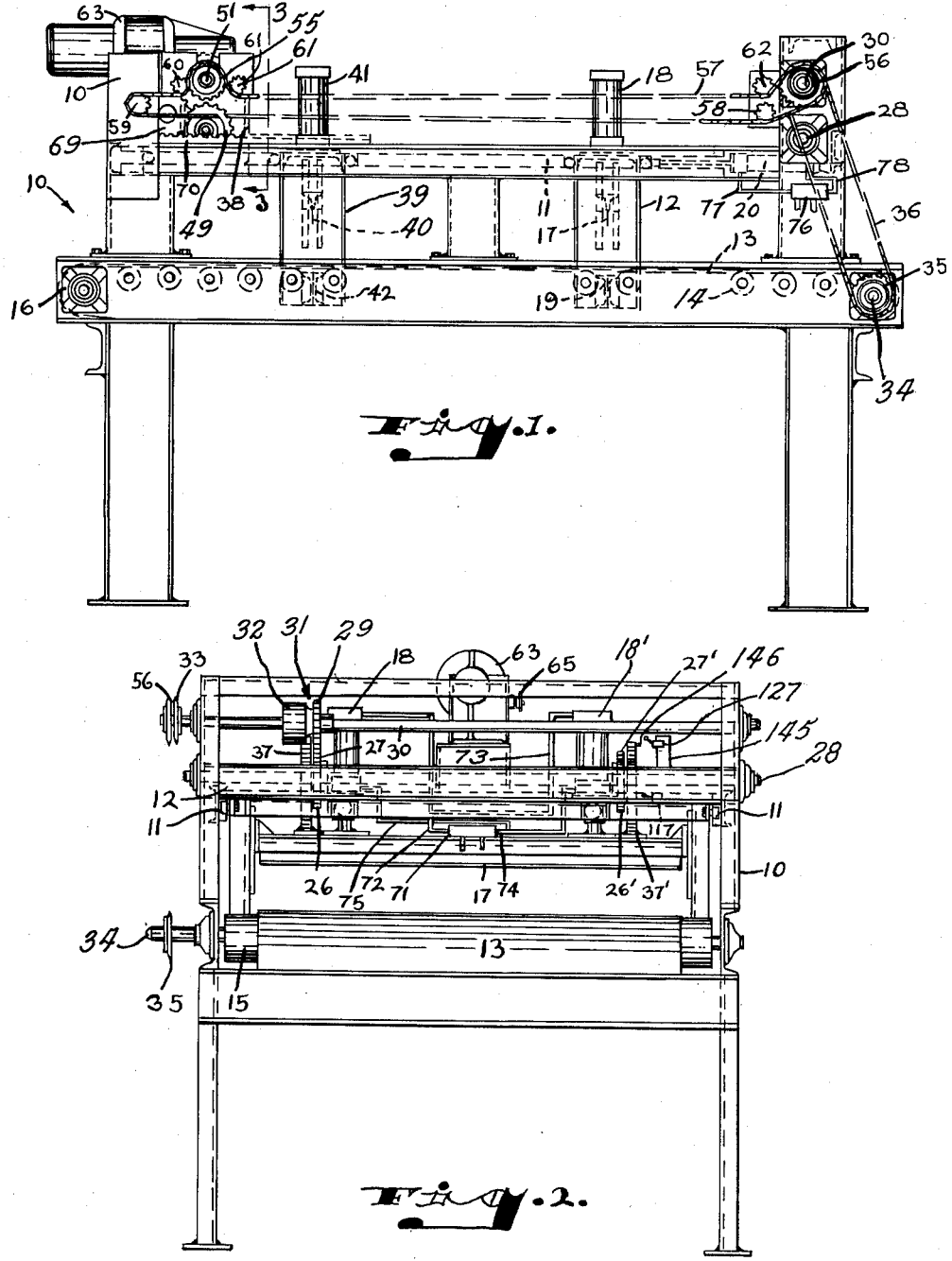
INVENTOR.
EARL R. OVERMAN
BY: Harold B. Hood
ATTORNEY

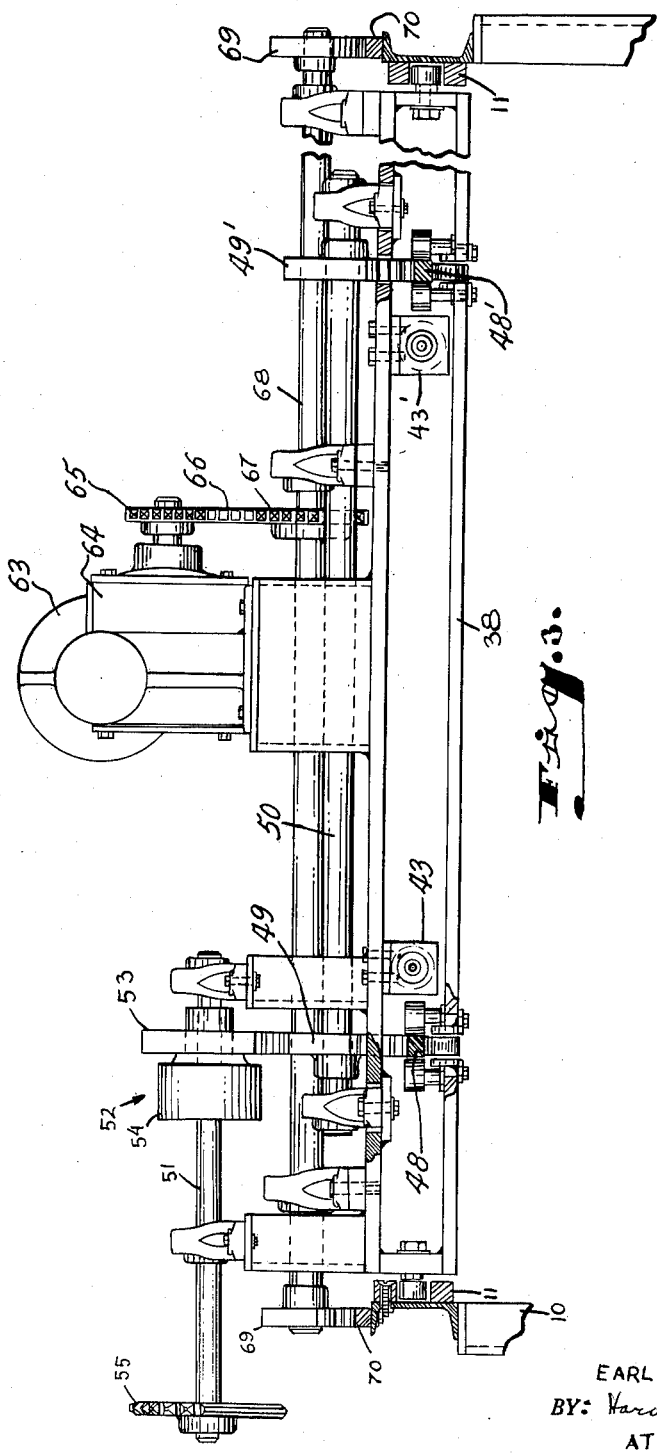

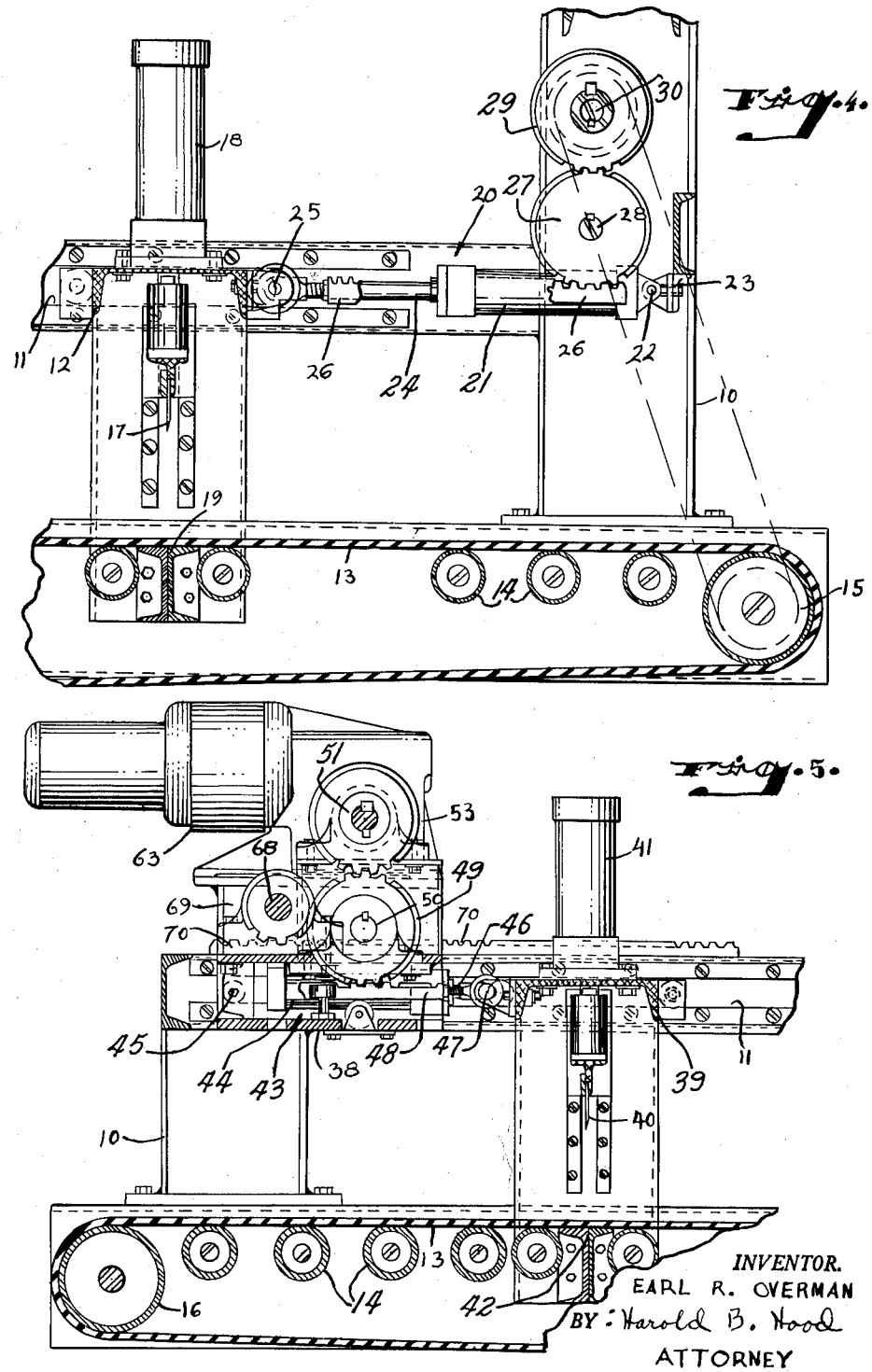

Feb. 5, 1963 E. R. OVERMAN 3,076,369
SYNCHRONIZING TWIN CUT-OFF MECHANISM
Filed Aug. 13, 1956 4 Sheets-Sheet 4

INVENTOR.
EARL R. OVERMAN
BY: Harold B. Hood
ATTORNEY

United States Patent Office 3,076,369
Patented Feb. 5, 1963

3,076,369
SYNCHRONIZING TWIN CUT-OFF MECHANISM
Earl R. Overman, deceased, late of Wabash, Ind.; by Mary B. Overman, Wabash, Ind., executrix, assignor to Rock Wool Engineering and Equipment Company, Inc., Wabash, Ind., a corporation of Indiana
Filed Aug. 13, 1956, Ser. No. 603,781
5 Claims. (Cl. 83—298)

The present invention relates to a synchronizing twin cut off mechanism, and is particularly concerned with a machine for cutting, scoring or marking, at predetermined intervals, a stream of material continuously flowing through the machine. The invention has been developed in connection with a machine of the flying shear type, and it has been so illustrated and will be so described; but it is particularly noted that, as will be obvious as the description proceeds, the kind of work done by the machine will depend to some extent upon the type of tool which is selected for use in the machine, and that therefore the machine, without other modification, can be used as effectively for scoring material or otherwise marking material, as for shearing material moving through the machine.

An object of the invention is to provide, in a machine of the class described, automatically-actuated fluid motors for moving a tool or tools in synchronism with the continuously flowing stream of material, while the tool or tools are in coactive engagement with the material, together with means driven in synchronism with the flowing material to restrain the tool or tools from running ahead of the material, under the influence of such fluid motors, during such engagement.

A further object of the invention is to provide fluid motors independent of the above-named motors for reciprocating the tool or tools into and out of such coactive engagement with the material.

A further object of the invention is to place the first-named fluid motors under the domination of tool reciprocation, whereby said first-named motors will not be activated to move the tool or tools in a direction opposite the direction of flow of material through the machine until the tool or tools have been completely retracted from coactive engagement with the material.

A further object of the invention is to provide, in a machine having the characteristics above described, means whereby the spacing, in line with material flow, between two or more tools may be adjusted without affecting the above characteristics.

Still further objects of the invention will appear as the description proceeds.

To the accomplishment of the above and related objects, my invention may be embodied in the forms illustrated in the accompanying drawings, attention being called to the fact, however, that the drawings are illustrative only, and that change may be made in the specific constructions illustrated and described, so long as the scope of the appended claims is not violated.

Figure 7:
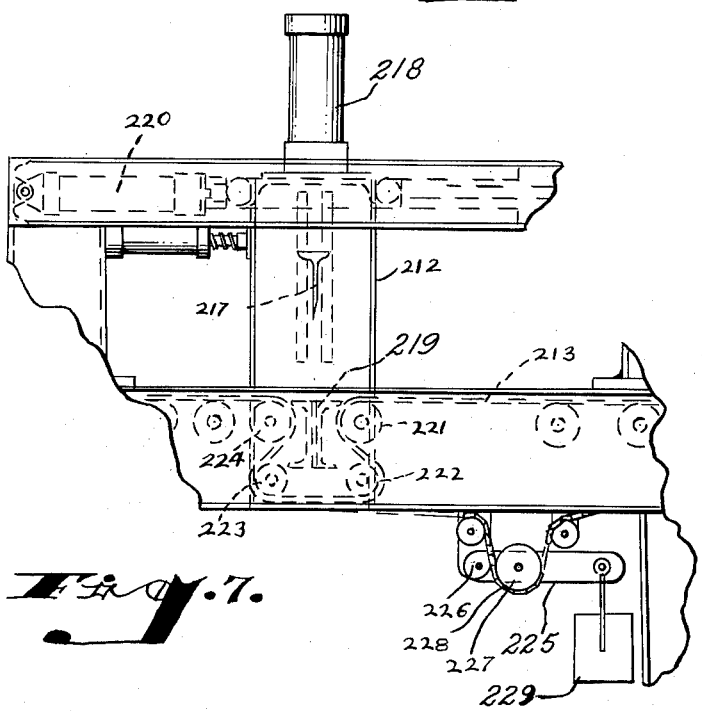

FIG. 1 is a side elevation of a machine constructed in accordance with the present invention;
FIG. 2 is an end elevation of the machine, viewed from the right of FIG. 1;
FIG. 3 is an enlarged fragmentary section taken substantially on the line 3—3 of FIG. 1;
FIG. 4 is an enlarged, fragmentary, longitudinal section showing details of the mechanism near the right hand end of FIG. 1;
FIG. 5 is a similar view showing details of the mechanism appearing at the left hand end of FIG. 1;
FIG. 6 is an elementary wiring diagram showing the controls for that portion of the machine illustrated in FIG. 5; and FIG. 7 is a fragmentary side elevation of a modified embodiment of the machine.

Referring more particularly to the drawings, it will be seen that I have illustrated a machine comprising a frame 10 formed to provide a longitudinally extending trackway 11 upon which a carriage 12 is mounted for limited reciprocation. Means for transporting material through the machine in a continuous stream in line with the trackway 11 may comprise a continuous, rubber-covered conveyor belt 13 trained over rolls 15 and 16 arranged upon parallel axes at opposite ends of the machine, the upper run of said belt preferably being supported upon idler rollers 14. Suitable means (not shown) will be provided for continuously driving, for instance, the shaft 34 upon which the roll 15 is mounted.

A tool, such as the knife 17, is supported from the carriage 12 for movement into and out of coactive engagement with a stream of material carried upon the upper run of the conveyor belt 13; and one or more fluid motors 18, 18', supported upon the carriage 12, will be arranged to reciprocate said tool. Preferably, an anvil 19 is supported at the lower end of the carriage 12, in underlying relation to the upper run of the conveyor belt 13; to facilitate the action of the tool 17 upon the stream of material.

One or more fluid motors 20 will be provided for moving the carriage 12 along the trackway 11. As is most clearly illustrated in FIG. 4, each such motor comprises a cylinder 21 connected at 22 to a bracket 23 supported from the machine frame and enclosing a piston whose stem 24 is operatively connected at 25 to the carriage 12. Secured to the carriage 12 for movement therewith I provide one or more racks 26 and 26', the rack 26 meshing with a pinion 27 and the rack 26' meshing with a similar pinion 27', the pinions 27 and 27' being fixed to a shaft 28 suitably journalled in the frame 10. It will be readily perceived that the racks 26 and 26', which engage the carriage 12 near the opposite ends thereof and which respectively mesh with corresponding pinions fixed to the shaft 28, will prevent any canting of the carriage 12, or movement of one end thereof at a rate different from the rate of movement of the other end thereof, under the influence of the motor or motors 20.

Additionally, it will be seen that the pinion 27 meshes with a gear 29 supported upon a shaft 30 which is journalled in the machine frame 10. The gear 29 moves with the input element of a one-way clutch 31, the output element 32 of which is fixed to the shaft 30. The clutch is so proportioned and designed that a driving connection will be established between the rack 26 and the shaft 30 only when the rack 26 moves, in the direction of material flow through the machine, at a velocity equal to the velocity of material flow.

Fixed to the shaft 30 is a sprocket 33 which is connected, by a chain 36, with a sprocket 35 fixed to the shaft 34. In the illustrated embodiment of the invention, the sprockets 35 and 33 are of equal pitch diameters, so that, during operation of the machine, the shaft 30 is continuously driven at an angular velocity equal to the angular velocity of the shaft 34; which angular velocity, in turn, is identical with the angular velocity which is imparted to the gear 29 by movement of the rack 26 in the direction, and at the lineal velocity, of material flow through the machine.

Consequently, when the carriage 12 is stationary, the shaft 30 freely overruns the gear 29; when the carriage 12 travels toward the left, as viewed in FIGS. 1 and 4, which is opposite the direction of material flow through the machine, the gear 29 will be rotated in a counter-clockwise direction, whereby the shaft 30 will overrun the gear 29 at a greater differential; and when the carriage 12 travels toward the right as viewed in FIGS. 1 and 4, at any velocity less than that of the material flowing through the machine, the shaft 30 will still overrun the gear 29 at a lower differential. But when carriage movement toward the right attains a velocity equal to that of the material flowing through the machine, the input element of the clutch will become engaged with the output element thereof; and since the shaft 30, to which the clutch output element is fixed, cannot be driven at a speed exceeding that of the shaft 34, the clutch will act to restrain the rack 26, and thus the carriage 12, against movement to the right, under the influence of the motor or motors 20, at a velocity exceeding that of material flow through the machine.

Upstanding racks 37, 37' are provided, adjacent opposite ends of the tool 17; and said racks will mesh with pinions (not shown) on a shaft journalled on the carriage 12 to retain the tool against canting out of a truly horizontal position.

An auxiliary frame 38 is supported for movement along the trackway 11 at a point removed from the location of the carriage 12. Between the auxiliary frame 38 and the carriage 12 there is provided a second carriage 39 mounted for movement along the trackway 11. A tool 40 is supported from said carriage 39 for reciprocation into and out of coactive engagement with a stream of material moving through the machine on the conveyor belt 13; and one or more fluid motors 41 will be provided for so reciprocating the tool 40. Preferably, an anvil 42 similar to the anvil 19 is carried by the carriage 39 beneath the upper run of the conveyor belt 13.

I provide one or more fluid motors 43 for moving the carriage 39 relative to the auxiliary frame 38. Each such motor comprises a cylinder 44 anchored at 45 on the auxiliary frame 38 and a piston having a piston rod 46 operatively connected at 47 to the carriage 39. One or more racks 48, 48' similar to the racks 26, are connected to move with the carriage 39. One rack 48 meshes with a pinion 49 fixed to a shaft 50 journalled on the auxiliary frame 38; and, as is most clearly shown in FIG. 3, the rack 48' similarly meshes with a similar pinion 49', likewise fixed to the shaft 50. A further shaft 51 is journalled in suitable bearings on the auxiliary frame 38 and a gear 53, similar to the gear 29, supported upon the shaft 51, meshes with the pinion 49. The gear 53 is fixed to rotate with the input element of a one-way clutch 52, the output element 54 of which is fixed to the shaft 51. Outboard, the shaft 51 carries a sprocket 55.

Referring to FIG. 1, it will be seen that a sprocket 56 is carried on the shaft 30, and that a chain 57 is trained about the sprocket 56, under an idler sprocket 58 journalled on the frame 10, about an idler sprocket 59 journalled near the opposite end of the frame 10, under an idler sprocket 60 journalled on the auxiliary frame 38, over the sprocket 55, under a further idler sprocket 61 journalled on the auxiliary frame 38, and under a further idler sprocket 62 journalled on the frame 10. Thereby, the shaft 51 will be continuously driven in the direction, and at the velocity, of the shaft 30. Since the pinion 49, meshing with the rack 48, will be actuated, by movement of the carriage 39 relative to the auxiliary frame 38, in precisely the manner in which the pinion 27 will be actuated by movement of the carriage 12, it will be perceived that the carriage 39 will thus be restrained against movement, in the direction of the material flow, at a velocity exceeding that of the flowing material.

A reversible electric motor 63 is supported on the auxiliary frame 38 and is connected, through a reducer 64, to drive a sprocket 65 connected by a chain 66 to drive a sprocket 67 fixed on a shaft 68 journalled on the auxiliary frame 38. Cogs 69, 69', fixed to the shaft 68, mesh with racks 70 fixed on the machine frame. Thus, operation of the motor 63 in one direction or the other will drive the auxiliary frame, in one direction or the other, along the trackway 11 to adjust, within a predetermined range, the spacing between the tools 17 and 40.

A four-way, spring-return, solenoid-controlled valve 71 is suitably mounted on the carriage 12 to control flow of fluid under pressure from a source (not shown) to the motors 18 and 18'. As shown, a conduit 72 leads from one end of the valve 71 to the upper end of the motor 18, and a branch conduit 73 leads from the conduit 72 to the upper end of the motor 18'; while a conduit 74, having a branch 75, leads from the opposite end of the valve 71 to the lower end of the motor 18', the branch 75 leading to the lower end of the motor 18. When the valve 71 is in its normal position, it establishes communication between the supply source and the lower ends of the motors 18 and 18', while connecting the upper ends of said motors to exhaust; but when the solenoid (later to be described (dominating the valve 71 is energized, said valve establishes communication between the fluid source and the upper ends of the motors 18 and 18', while exhausting the lower ends thereof.

A similar valve 76, mounted on the frame 10, normally establishes communication between the supply source and, through conduit 78, the rear or right hand end of motors 20, while exhausting the forward, or left hand, ends thereof. When the valve 76 is actuated, by energization of its dominating solenoid, it establishes communication between the pressure source and, through the conduit 77, the left hand ends of the motors 20, while exhausting the right hand ends thereof.

Similar valves (not shown), under similar domination, control the motors 41 and 43.

In FIG. 6, I have illustrated an electric control system for the valves 71 and 76. Line wires 80 and 81 are connected with a source of electrical energy; and line wire 80 leads through a normally closed over-travel limit switch 82 to a wire 83. Wire 84 connects wire 83 with wire 85 which leads to switch terminal 86 of relay 87; and a wire 88 connects wire 84 with switch terminal 89 of the same relay.

A wire 90 leads from wire 83 through wire 91 to switch terminal 92 of relay 93, and a wire 94 connects wire 90 with switch terminal 95 of said relay 93. A wire 96 leads from wire 83 through wire 97 to switch terminal 98 of relay 99; and a further wire 100 connects wire 96 with switch terminal 101 of the relay 99.

The entire system is dominated by a timing device (not shown) which momentarily closes switch 102 at predetermined intervals in the cycle of the machine. When switch 102 is closed, it establishes a circuit from line wire 80 through wire 103, switch 102, wire 104, terminal 105 of relay 87, normally closed bridge-piece 106, terminal 107, wire 108, energizing coil 109 of relay 93, wire 110 and wire 111 to line wire 81. Energization of coil 109 closes bridge-pieces 112 and 122 against their terminals to establish a circuit from line wire 80, through wire 83, wire 90, wire 91, terminal 92, bridge-piece 112, terminal 113, wire 114, wire 115, terminal 116 of normally closed limit switch 117 (which, as will be seen from FIG. 2, is mounted on the carriage 12 adjacent rack 37'), terminal 118, wire 119, coil 120 of relay 99, wire 121 and wire 111 to line wire 81. At the same time, a circuit is established from line wire 80 through wire 83, wire 90, wire 94, terminal 95, bridge-piece 122, terminal 123, wire 124, wire 125, terminal 126 of normally closed limit switch 127 (which, as will be seen from FIG. 2, is mounted on a bracket 145 adjacent the rack 37'), terminal 128, wire 129, coil 130 of relay 87, wire 131 and wire 111 to line wire 81.

Energization of coil 130 closes bridge-pieces 132 and 147 of said relay. Closure of bridge-piece 147 establishes a holding circuit for coil 130 from line wire 80, through wire 83, wire 84, wire 85, terminal 86, bridge-piece 147, terminal 148, wire 149, wire 125, limit switch 127, wire 129, coil 130, wire 131 and wire 111 to line wire 81.

Closure of bridge-piece 132 establishes a circuit from line wire 80, through wire 83, wire 84, wire 88, terminal 89, bridge-piece 132, terminal 133, wire 134, solenoid coil 135 of valve 76, wire 136, wire 131 and wire 111 to line wire 81.

Energization of coil 135 shifts valve 76 to supply fluid under pressure to the left hand end of motors 20, whereby carriage 12 will be moved toward the right as viewed in FIG. 1. It will be remembered that the carriage 12 is so arranged that such movement will be synchronized with the flow of material through the machine.

Closure of bridge-piece 137 of relay 99 upon its terminals 98 and 138 establishes a circuit from line wire 80 through wire 83, wire 96, wire 97, terminal 98, bridge-piece 137, terminal 138, wire 139, solenoid coil 140 dominating valve 71 and wire 141 to line wire 81. Energization of solenoid 140 shifts valve 71 to supply fluid under pressure to the upper ends of motors 18 and 18' whereby the tool 17 will be driven downwardly into coactive engagement with the material flowing through the machine.

When the knife 17 reaches the lower limit of its stroke, a trip 146 carried on the rack 37' engages the actuating arm of limit switch 117 to open that switch. Thereby, the energizing circuit for coil 120 of relay 99 will be broken to deenergize coil 140 by breaking its energizing circuit at 137. The valve 71 will thereupon return, under the influence of its spring, to a position in which it supplies fluid under pressure to the lower ends of the motors 18 and 18', whereby the tool 17 will be returned to its upper position. As the tool reaches its uppermost position, the trip 146 engages the actuating arm of limit switch 127 to open that switch, thereby deenergizing the coil 130 of relay 87. This breaks the energizing circuit for solenoid coil 135, at 132, thereby permitting its spring to return the valve 76 to its normal position in which it supplies fluid under pressure to the right hand end of the motor 20, to return the carriage 12 to its illustrated position.

An identical electrical control circuit will operate similar valves which dominate the motors 41 and 43 which control operation of the tool 40 and carriage 39, respectively. A suitable, manually controlled selector switch (not shown) will be provided to determine whether impulses from the timing device will be fed to the control system for the carriage 12 and tool 17, to the control system for the carriage 39 and tool 40, or to both systems simultaneously.

The machine is designed for cutting, scoring or marking, desired lengths of material moving rapidly through the machine. Since a definite amount of time is required for each tool to complete its cycle of operation upon the material, the lineal distance between points of operation of a single tool upon such material is limited. Where two tools are used, in such a machine, in the manner illustrated, to act simultaneously upon the flowing stream of material, obviously that limited, minimum distance between operations will be shortened by half.

For instance, if it be assumed that the cycle of the tool 17 requires a period of time corresponding to the time during which sixteen inches of material will flow through the machine, it is obvious that, using a single tool, the minimum lineal distance between points at which the tool 17 can operate on the material is sixteen inches. However, if the auxiliary frame 38 is moved along the trackway 11 to a point at which the distance between the tools 17 and 40 is eight inches, and if the selector switch is set to cause the impulses to be fed to both electrical control systems simultaneously, it will be clear that the stream can be acted upon at intervals of eight inches. In the illustrated machine, the tool 40 may be set as far away from the tool 17 as forty-eight inches, or as close as eight inches, so that, using both tools, the stream of material may be acted upon at intervals anywhere within the range between eight inches and forty-eight inches. If it is desired to act upon the stream at intervals greater than forty-eight inches, only one of the tools will be used.

It will be obvious that, by following the teachings of the present disclosure, any desired number of auxiliary frames similar to the frame 38 and its associated elements, may be used in conjunction with the carriage 12 and its associated parts.

In FIG. 7, I have illustrated a modification of the above machine including a carriage 212 like the carriage 12, similarly supporting a tool 217 to be moved into and out of coactive engagement with material flowing through the machine by a fluid motor 218, the carriage being reciprocable under the influence of a motor 220, and carrying an anvil 219. In this form of the machine, however, the tool and the anvil will cooperate directly, without the interposition of the conveyor belt 213 therebetween. To that end, the conveyor belt is threaded over idler rollers 221, under rollers 222 and 223, and over rollers 224, whereby the belt is carried beneath the anvil 219. In this respect, the machine corresponds to the disclosure of my prior Patent No. 2,682,307 issued June 29, 1954.

If desired, and to maintain the conveyor belt under suitable tension, the lower run of the belt may be formed into a bight 228 in which is supported a dance roll 227 journalled in a pair of arms 225, pivoted at 226 to a suitable bracket, the free end of the arm supporting a weight 229 which may be of variable mass.

I presently believe that the several fluid motors of the present disclosure may most advantageously be pneumatic motors; but it will be obvious that, for certain uses, hydraulic motors may be substituted for some or all of such pneumatic motors.

I claim as my invention:

1. In a machine of the class described, a frame providing trackway means, means for transporting material through said machine in line with the trackway means, a first carriage mounted for reciprocation along said trackway means, a tool supported from said first carriage for movement into and out of coactive engagement with material moving through said machine, a first fluid motor for so reciprocating said first carriage, an auxiliary frame mounted for reciprocation along said trackway means, motors means mounted on said auxiliary frame for driving said auxiliary frame along said trackway means toward and away from said first carriage, a second carriage mounted for reciprocation along said trackway means, a tool supported from said second carriage for movement into and out of coactive engagement with material moving through said machine, a second fluid motor comprising a piston element and a cylinder element, one of said elements being secured to said auxiliary frame and the other element being connected to said second carriage whereby said second carriage is connected to move with said auxiliary frame, said second fluid motor being operable to reciprocate said second carriage along said trackway means relative to said auxiliary frame, a first shaft journalled in said first-named frame, means providing a driving connection between said first carriage and said first shaft to rotate said first shaft in a direction and at a velocity corresponding to the direction and velocity of movement of said first carriage under the influence of said first fluid motor, a second shaft journalled in said auxiliary frame, means providing a driving connection between said second carriage and said second shaft to rotate said second shaft in a direction and at a velocity corresponding to the direction and velocity of movement of said second carriage under the influence of said second fluid motor, rotary means constantly driven at a velocity proportional to the velocity of said material-transporting means, and means for each shaft dominated by said rotary means and effective to restrain rotation of its associated shaft, in a direction corresponding to movement of its associated carriage in the direction of material movement, to a velocity corresponding to carriage movement equal to the velocity of such material movement.

2. In a machine of the class described, a frame providing trackway means, means for transporting material through said machine in line with the trackway means, a first carriage mounted for reciprocation along said trackway means, a tool supported from said first carriage for movement into and out of coactive engagement with material moving through said machine, a first fluid motor for so reciprocating said first carriage, an auxiliary frame mounted for reciprocation along said trackway means, motor means mounted on said auxiliary frame for driving said auxiliary frame along said trackway means toward and away from said first carriage, a second carriage mounted for reciprocation along said trackway means, a tool supported from said second carriage for movement into and out of coactive engagement with material moving through said machine, a second fluid motor comprising a piston element and a cylinder element, one of said elements being secured to said auxiliary frame and the other element being connected to said second carriage whereby said second carriage is connected to move with said auxiliary frame, said second fluid motor being operable to reciprocate said second carriage along said trackway means relative to said auxiliary frame, a first shaft journalled in said first-named frame, means providing a driving connection between said first carriage and said first shaft to rotate said first shaft in a direction and at a velocity corresponding to the direction and velocity of movement of said first carriage under the influence of said first fluid motor, a second shaft journalled in said auxiliary frame, means providing a driving connection between said second carriage and said second shaft to rotate said second shaft in a direction and at a velocity corresponding to the direction and velocity of movement of said second carriage under the influence of said second fluid motor, rotary means constantly driven at a velocity proportional to the velocity of said material-transporting means, a one-way clutch for each shaft, means providing a driving connection between said rotary means and the output element of each such clutch, and means connecting each shaft to drive the input element of its associated clutch in the direction of rotation of its output element when its associated carriage moves in the direction of material movement.

3. In a machine of the class described, a frame providing trackway means, means for transporting material through said machine in line with said trackway means, a carriage mounted for reciprocation along said trackway, a tool supported from said carriage for movement into and out of coactive engagement with material moving through the machine, a fluid motor including a piston element and a cylinder element, one of said elements being anchored on said frame and the other element being operatively connected to said carriage, a rack connected to move with said carriage, a pinion mounted for rotation upon an axis fixed with respect to said frame and meshing with said rack, a shaft journalled on said frame, a one-way clutch including an output element fixed on said shaft and an input element driven from said pinion, a rotary element driven continuously at a fixed ratio with respect to said material transporting means, means providing a constant-ratio drive connection between said rotary element and said shaft whereby said clutch output element is constantly driven in a direction, and at a velocity, corresponding to the movement of said clutch input element when driven by movement of said carriage in the direction and at the velocity of said material transporting means, said clutch being constructed and arranged to prevent said input element from overrunning said output element in the direction in which said output element is so driven, an auxiliary frame mounted for movement along said trackway toward and away from said first-named carriage, a second carriage mounted for reciprocation along said trackway, a second tool supported from said second carriage for movement into and out of coactive engagement with material moving through the machine, means on said auxiliary frame for shifting the same along said trackway, a second fluid motor comprising a piston element and a cylinder element, one of said elements being anchored on said auxiliary frame and the other of said elements being operatively connected to said second carriage whereby said second carriage is connected to move with said auxiliary frame, said second fluid motor being operable to reciprocate said second carriage along said trackway relative to said auxiliary frame, a second rack connected to move with said second carriage, a second pinion mounted for rotation upon an axis fixed with respect to said auxiliary frame and meshing with said second rack, a second shaft journalled on said auxiliary frame, a second one-way clutch including an output element fixed on said second shaft and an input element driven from said second pinion, and means providing a constant-ratio drive connection between said rotary element and said second shaft whereby said output element of said second clutch is constantly driven in a direction, and at a velocity, corresponding to the movement of said input element of said second clutch when driven by movement of said second carriage in the direction and at the velocity of said material transporting means, said second clutch being constructed and arranged to prevent said last-named input element from overrunning said last-named output element in the direction in which said last-named output element is so driven.

4. The machine of claim 3 in which said means providing a constant-ratio drive for said second shaft comprises a first sprocket on said first shaft, a second sprocket on said second shaft, a third sprocket journalled to rotate on an axis fixed with respect to said first named frame and so located that said second sprocket is always between said first and third sprockets, and an endless chain trained over said first and third sprockets and having meshing engagement with said second sprocket at a point intermediate its engagements with said first and third sprockets.

5. In a machine of the class described, a frame providing a trackway, means for transporting material through the machine in line with said trackway, a carriage mounted for reciprocation along said trackway, a first fluid motor for reciprocating said carriage along said trackway, a tool supported from said carriage for movement into and out of coactive engagement with material moving through the machine, a second fluid motor mounted on said carriage for so shifting said tool, and control means for said motors comprising a first valve dominating said first motor, a first solenoid effective, upon energization, to shift said first valve to a position to cause said first motor to move said carriage in the direction of movement of material through the machine, means effective upon deenergization of said solenoid to shift said first valve to a position to cause said first motor to move said carriage in an opposite direction, a second valve dominating said second motor, a second solenoid effective, upon energization, to shift said second valve to a position to cause said second motor to move said tool into engagement with material moving through the machine, means effective upon deenergization of said second solenoid to shift said second valve to a position to cause said second motor to move said tool away from such material, an energizing circuit for said first solenoid including a first normally closed switch, an energizing circuit for said second solenoid including a second normally closed switch, and means for closing said circuits substantially simultaneously, said second normally-closed switch including an actuating element positioned to be moved, as a result of completion of movement of said tool into engagement with such material, to circuit-opening position, and said first normally-closed switch including an actuating element positioned to be moved, as a result of completion of retraction of said tool, to circuit-opening position.

References Cited in the file of this patent
UNITED STATES PATENTS 1,468,452  Barber _____ Sept. 18, 1923

(Other references on following page)

UNITED STATES PATENTS

| | | |
|---|---|---|
| 1,910,387 | Hahn | May 23, 1933 |
| 2,149,430 | Fleming | Mar. 7, 1939 |
| 2,169,575 | Youngfelt et al. | Aug. 15, 1939 |
| 2,287,254 | Kellogg | June 23, 1942 |
| 2,326,536 | Hartsock et al. | Aug. 10, 1943 |
| 2,540,166 | Frank et al. | Feb. 6, 1951 |
| 2,578,825 | Mirfield et al. | Dec. 18, 1951 |
| 2,582,332 | Homer | Jan. 15, 1952 |
| 2,610,688 | Overman | Sept. 16, 1952 |
| 2,623,589 | Price et al. | Dec. 30, 1952 |
| 2,678,097 | Hahn et al. | May 11, 1954 |
| 2,697,489 | Siegerist | Dec. 21, 1954 |
| 2,746,126 | Talbot | May 22, 1956 |
| 2,757,734 | Richardson | Aug. 7, 1956 |